(12) United States Patent
Winslow

(10) Patent No.: US 10,876,517 B2
(45) Date of Patent: Dec. 29, 2020

(54) SLEW RING REPAIR AND DAMAGE PREVENTION

(71) Applicant: Wind Solutions, LLC, Sanford, NC (US)

(72) Inventor: Christopher James Winslow, Lemon Springs, NC (US)

(73) Assignee: Wind Solutions, LLC, Sanford, NC (US)

( * ) Notice: Subject to any disclaimer, the term of this patent is extended or adjusted under 35 U.S.C. 154(b) by 225 days.

(21) Appl. No.: 16/225,116

(22) Filed: Dec. 19, 2018

(65) Prior Publication Data

US 2019/0195196 A1 Jun. 27, 2019

Related U.S. Application Data

(60) Provisional application No. 62/609,552, filed on Dec. 22, 2017.

(51) Int. Cl.
| | |
|---|---|
| *F03D 80/50* | (2016.01) |
| *F03D 7/02* | (2006.01) |
| *F03D 9/25* | (2016.01) |
| *F16D 65/00* | (2006.01) |
| *B24B 7/16* | (2006.01) |

(52) U.S. Cl.
CPC .............. *F03D 7/0204* (2013.01); *B24B 7/16* (2013.01); *F03D 9/25* (2016.05); *F03D 80/50* (2016.05); *F16D 65/00* (2013.01); *F05B 2240/50* (2013.01); *F05B 2260/90* (2013.01); *F05B 2260/902* (2013.01); *F16C 2300/14* (2013.01); *F16C 2300/20* (2013.01); *F16C 2300/34* (2013.01); *F16C 2360/31* (2013.01)

(58) Field of Classification Search
CPC .......... F03D 7/0204; F03D 9/25; F03D 80/50; B24B 7/16; B24B 5/01; B24B 5/02; F16D 65/00; F05B 2240/50; F05B 2260/90; F05B 2260/902; F16C 2300/14; F16C 2300/20; F16C 2300/34; F16C 2360/31
USPC ...................................... 290/44, 55
See application file for complete search history.

(56) References Cited

U.S. PATENT DOCUMENTS

| | | | | |
|---|---|---|---|---|
| 3,596,558 | A * | 8/1971 | Rydell ..................... | B23B 39/00 409/178 |
| 4,094,612 | A * | 6/1978 | Krieg .................... | B25H 1/0064 248/230.9 |
| 5,035,087 | A * | 7/1991 | Nishiguchi ............... | B24B 7/16 451/14 |

(Continued)

*Primary Examiner* — Aaron R Eastman
*Assistant Examiner* — Theodore C Ribadeneyra
(74) *Attorney, Agent, or Firm* — Leveque IP Law, P.C.

(57) ABSTRACT

A system for slew ring repair includes a drive mechanism and a tool coupled thereto. The tool may include a fixture structurally configured to secure the tool to a frame on a top end of a wind tower, and a rotatable shaft having a proximal end and a distal end, where the proximal end is coupled to the drive mechanism and the distal end is structurally configured to insert within a housing on the top end of the wind tower that contains a slew ring of a wind turbine disposed on the wind tower. The tool may further include a grinder disposed on the distal end of the rotatable shaft, where the grinder is structurally configured to engage the slew ring while being rotated by the drive mechanism for repair or maintenance of the slew ring.

20 Claims, 7 Drawing Sheets

(56) References Cited

U.S. PATENT DOCUMENTS

| | | | | |
|---|---|---|---|---|
| 5,791,976 A * | 8/1998 | Honda | ...................... | B24B 7/04 |
| | | | | 451/271 |
| 5,816,895 A * | 10/1998 | Honda | ...................... | B24B 7/16 |
| | | | | 451/41 |
| 6,050,753 A * | 4/2000 | Turner | ................. | B25H 1/0064 |
| | | | | 408/88 |
| 6,224,462 B1 * | 5/2001 | Yokoyama | ................ | B24B 5/00 |
| | | | | 451/10 |
| 6,471,573 B1 * | 10/2002 | Reitmeyer | ................ | B24B 5/00 |
| | | | | 451/446 |
| 2012/0294684 A1 * | 11/2012 | Uriarte Mijangos | ... | F03D 80/50 |
| | | | | 408/76 |
| 2016/0082523 A1 * | 3/2016 | Thomsen | ................ | B23B 51/02 |
| | | | | 29/889.1 |
| 2016/0136771 A1 * | 5/2016 | Fuwa | ...................... | B24B 5/00 |
| | | | | 451/28 |
| 2016/0207158 A1 * | 7/2016 | Fukui | ...................... | B24B 5/04 |

* cited by examiner

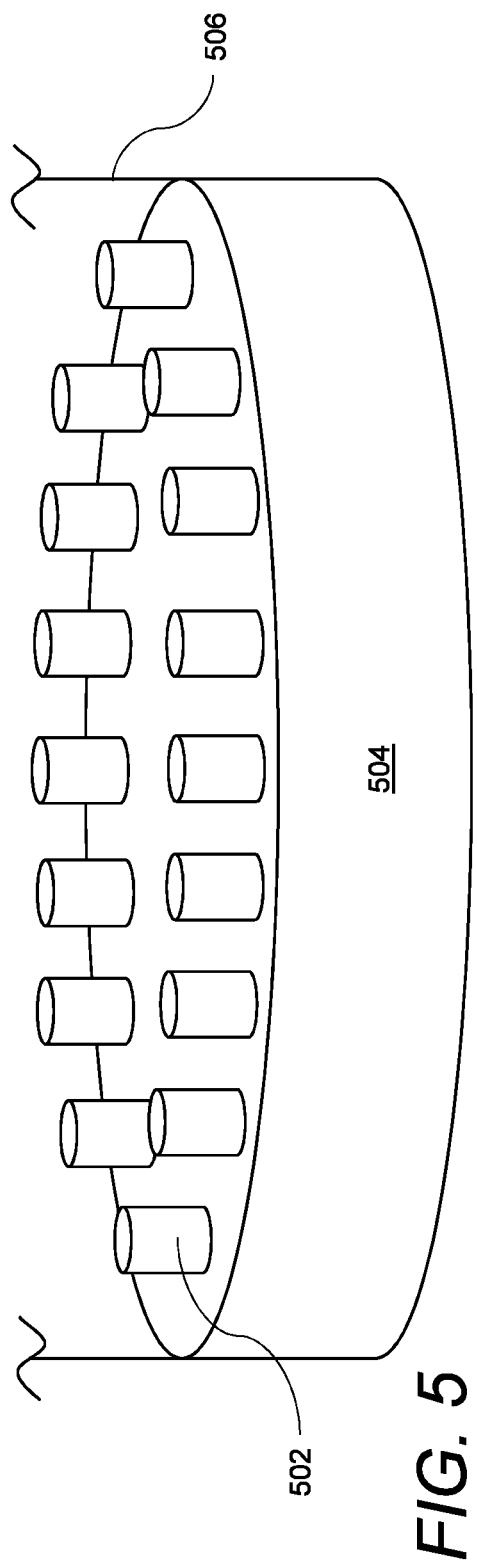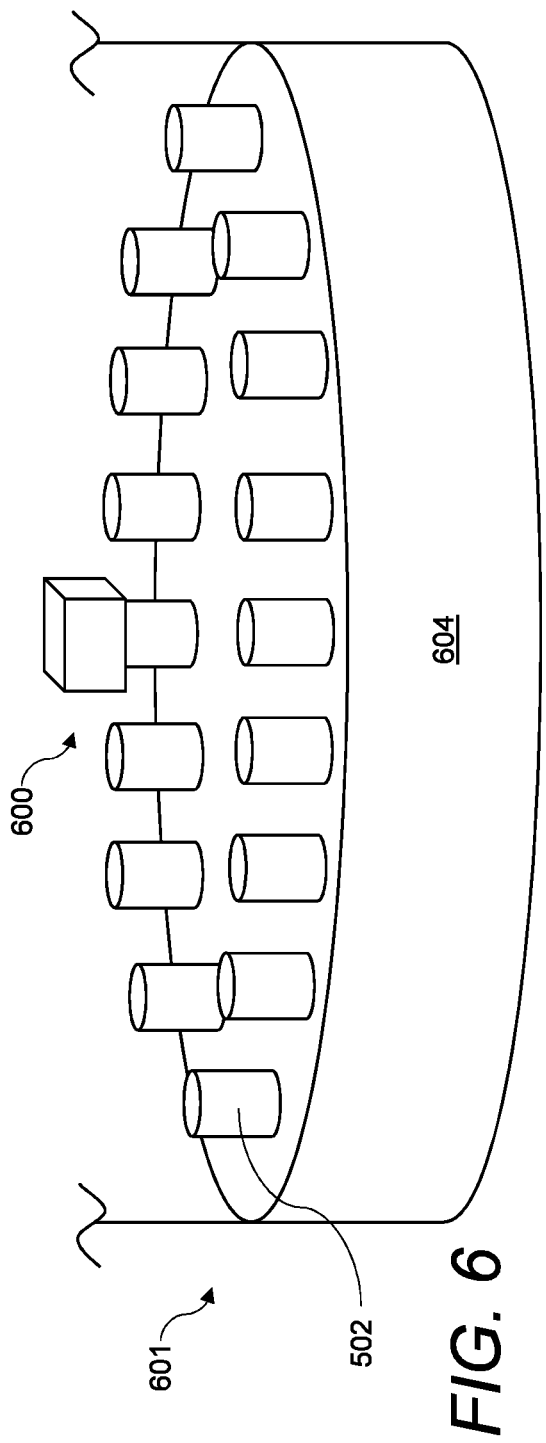

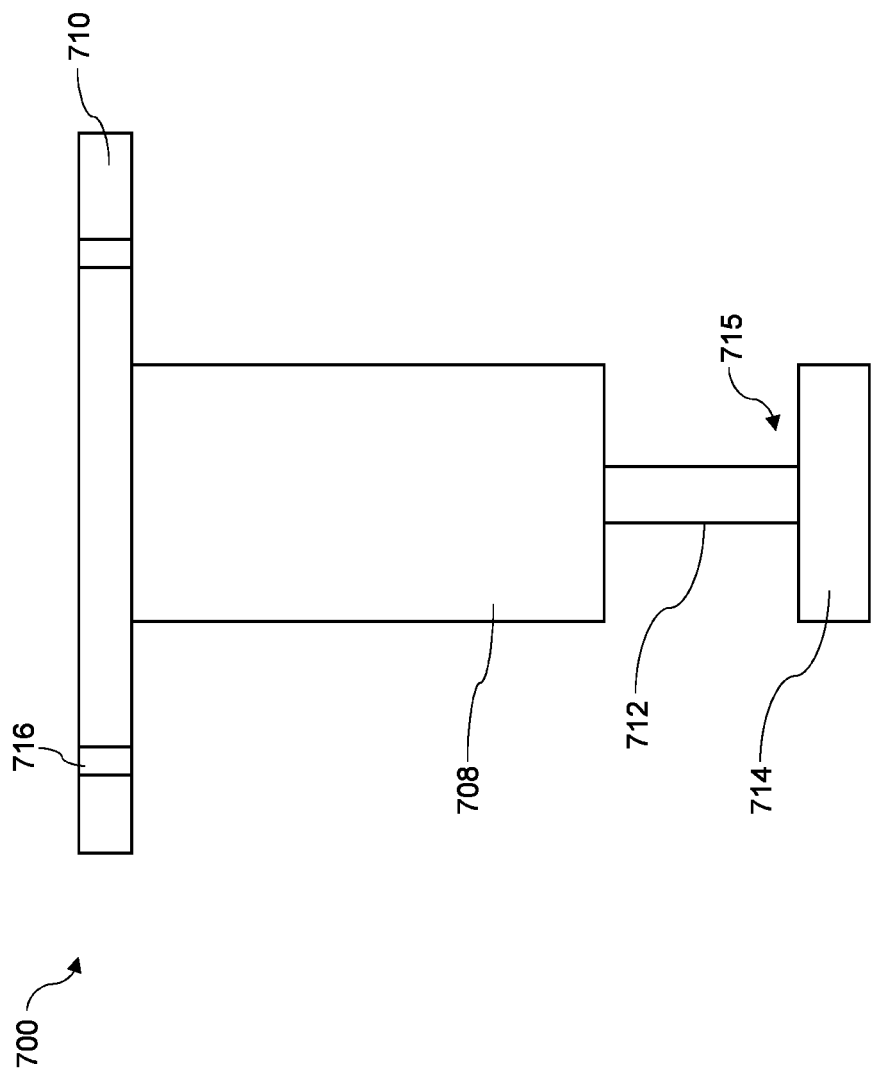

SLEW RING REPAIR AND DAMAGE PREVENTION

CROSS-REFERENCE TO RELATED APPLICATIONS

This application claims the benefit of U.S. Provisional Patent Application No. 62/609,552 filed on Dec. 22, 2017, the entire content of which is hereby incorporated by reference.

BACKGROUND

Wind turbines, especially utility-scale wind turbines, may include a yaw braking system that holds the turbine pointed into the wind. Like conventional braking systems, pads or the like may be employed with a mating surface, referred to as a slew ring, which may be made of steel or the like. Over time, a slew ring can wear, and the surface of the slew ring can become rough, where the slew ring may require resurfacing or other maintenance and repair. In general, existing solutions for replacement or repair of slew rings are problematic. For example, a slew ring may not be easily field-replaced without removing the entire turbine from the top of the wind tower, which can be prohibitively expensive. Moreover, access to a slew ring for maintenance and repairs may be limited. There remains a need for improved repair and damage prevention techniques for slew rings on wind turbines.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 5 illustrates yaw brakes on a top end of a wind tower for context.

FIG. 6 illustrates a system for slew ring repair on a top end of a wind tower, in accordance with a representative embodiment.

FIG. 7 illustrates a tool, in accordance with a representative embodiment.

DETAILED DESCRIPTION

Figure 1:
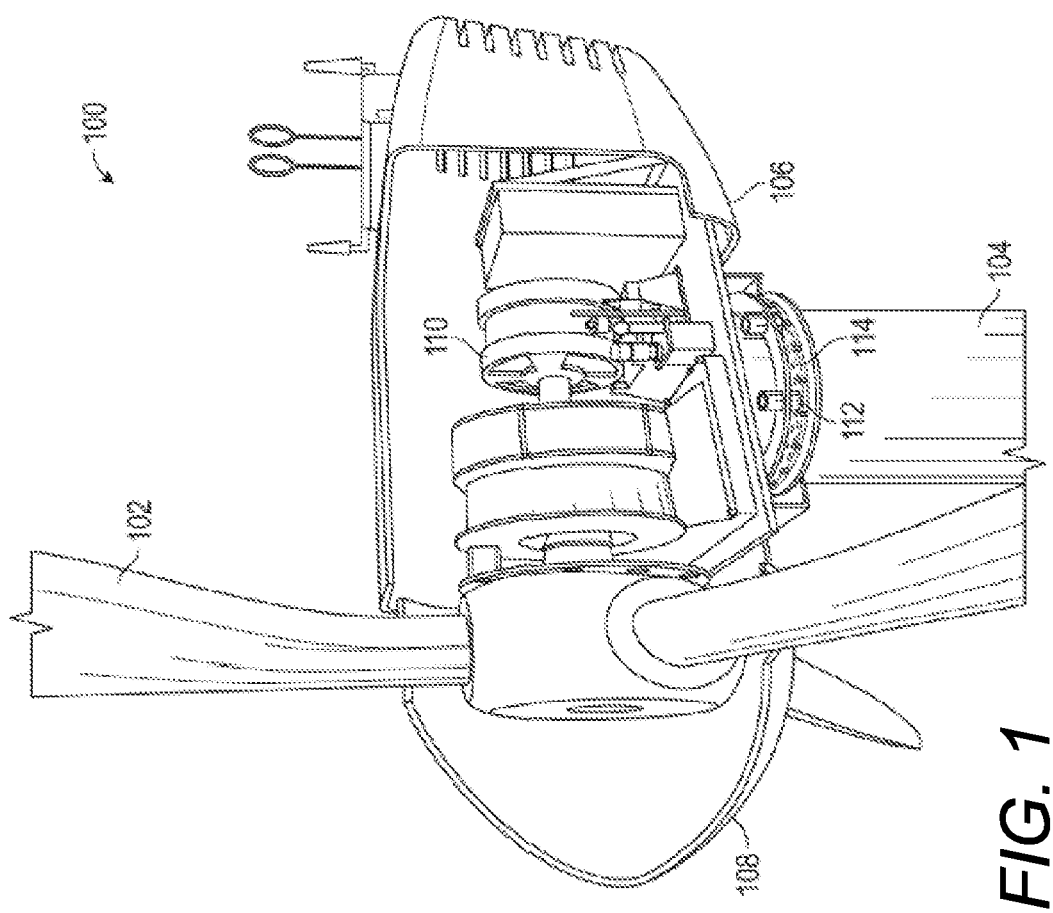
FIG. 1 illustrates a wind turbine for context.

The various methods, systems, apparatuses, and devices described herein may generally provide for the repair and/or maintenance of a slew ring, e.g., a slew ring included on wind turbines and the like.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may be configured for, and may include, tools for the repair, maintenance, and damage prevention of a slew ring, e.g., a slew ring included on a wind turbine and the like. For example, a tool described herein may perform up-tower, in situ, resurfacing of a slew ring on a wind turbine. In general, such a tool or system may include a drive mechanism (e.g., a motor), a stabilizing body, and a grinder affixed to rotatable shaft. For example, a stabilizing body, housing, or another fixture(s) may hold a motor assembly in place, where the motor is controllable to drive (e.g., rotationally drive) a shaft having a grinder on its end. The grinder may include, e.g., a sanding pad, a grinding pad, a polishing pad, a cutting tool, and so on.

Implementations may also or instead include a system or a tool for maintenance or damage prevention of a slew ring on a wind tower or the like. Such a tool may be installed in situ on a wind tower, e.g., in a location near the brakes/pistons of the wind tower. The tool may include components to attract wear or repair debris, e.g., magnets, suction devices, and the like.

Thus, in general, described herein are devices, systems, and methods for slew ring repair and damage prevention. In the context of the present teachings, and unless explicitly stated to the contrary or otherwise clear from the context, it will be understood that the terms "repair," "maintenance," and the like may be used interchangeably, and may include such things an instance or operation of repairing, restoring, renewing, remedying, strengthening, adjusting, reconditioning, reconstructing, reshaping, polishing, cleaning, reforming, improving, conserving, preserving, upkeeping, and so on. Such maintenance and repair may be done for a finite period of time, or may be done continuously. Similarly, "damage prevention" and like terminology as used herein shall be understood to include maintaining a desired state of being, or performing an operation to prevent an undesired state of being. In some instances, "repair," "maintenance," and "damage prevention" can all be performed in the same operation, and can have similar meanings. Also, it will be understood that "damage prevention" may be done for a finite period of time, or may be done continuously.

Before describing the present teachings for slew ring repair and damage prevention, a wind turbine and yaw brake are described below for context. Also, or instead, further description of wind turbines, yaw brakes, slew rings, and so on, can be found in Int'l Patent Application No. PCT/US2016/031558 (published as WO2016/183045), which is incorporated by reference herein in its entirety. Thus, it will be understood that the wind turbines described herein and any components thereof, such as the yaw brakes, may be the same or similar to those described in Int'l Patent Application No. PCT/US2016/031558. Also, or instead, the wind turbines described herein and any components thereof, such as the yaw brakes, may be the same or similar to others that are known in the technical field of wind turbines and the like. As such, it will be understood that the devices, systems, and methods described herein may be used with, or may be adapted for use with, any of the aforementioned or foregoing wind turbines and components thereof.

FIG. 1 illustrates a wind turbine 100 for context. The wind turbine 100 may generally be used for energy generation or conversion, e.g., for converting wind energy to electrical energy through movement of one or more turbine blades 102. The wind turbine 100 may include a tower 104 (e.g., erected on a foundation or the like), a nacelle 106 mounted at a top end of the tower 104, and a rotor head 108 coupled to the nacelle 106 in a manner that permits rotation of the rotor head 108 relative to the nacelle 106. In general, the nacelle 106 may include a cover or housing that contains all or most of the generating components 110 in a wind turbine 100, e.g., a generator, a gearbox, a drive train, a yaw bearing assembly, and a brake assembly.

The wind turbine 100 may include a plurality of turbine blades 102 (e.g., three in this exemplary embodiment) that are attached to the rotor head 108 in a radiating pattern. In use, wind striking the turbine blades 102 may cause the rotor head 108 to rotate, where a generator or similar is structurally configured to convert this rotational force to energy such as electricity. Also, or instead, the turbine blades 102 may be connected to the rotor head 108 in a manner facilitating movement with respect to the wind direction, thus making it possible to change pitch angles of the turbine blades 102. To this end, in certain embodiments, a wind vane may detect wind direction and provide data related thereto to a controller (e.g., a programmable logic controller (PLC) or similar) to trigger a yaw mechanism to adjust the yaw of the nacelle 106.

In general, and as used herein, a yaw system of a wind turbine 100 may include a set of components structurally configured to facilitate the orientation of the rotor head 108 towards the wind. The yaw system may include a yaw brake 112 for holding, locking, or otherwise steadying a position (e.g., yaw position) for the wind turbine 100 (e.g., the rotor head 108 of the wind turbine 100). To this end, the yaw brake 112 may include a yaw pad that is engageable with a bearing surface, e.g., a slew ring 114, which may include a relatively large diameter disk made of steel or the like having a gear at a rim thereof. The yaw pad may include a dry or lubricated pad, e.g., made of bronze (or the like) or a composite material, that bears against the slew ring 114. It will be understood that the yaw pad may also or instead include, or may otherwise be referred to in the art as, a yaw bearing, a gliding yaw pad, a gliding yaw bearing, a yaw bearing pad, a yaw brake pad, a yaw puck, and so on. Regardless, in general, the yaw pad may be structurally configured to stabilize rotation of the nacelle 106 of the wind turbine 100, and to generally provide relatively smooth rotation of the nacelle 106 into the wind under a wide range of weather conditions. As stated above, the material of the yaw pad may include without limitation one or more of brass, bronze (e.g., sintered bronze, oil impregnated bronze, and the like), a polymer, a composite, sintered metal, polyether ether ketone (PEEK), a layered synthetic fiber reinforced formulation (e.g., having a wear layer of polyester resin and fabric with polytetrafluoroethylene (PTFE) fibers), and so on.

The yaw system, or the wind turbine 100 more generally, may also or instead include an anti-rotation collar. The anti-rotation collar may include a structure residing at the interface of a thrust stem and a yaw piston that stabilizes the thrust stem by inhibiting rotation of the thrust stem and/or limiting the degree of rocking motion of the thrust stem so as to reduce or eliminate contact with the yaw piston and/or wear to the yaw piston caused by such motions.

In setup and use, when the nacelle 106 of the wind turbine 100 is positioned on the tower 104, the pressure on each of the individual yaw pads of each yaw brake 112 may be adjusted in order to avoid un-even wear of the yaw pads and excessive loading on portions of the yaw pads and slew ring 114. In order to achieve a desired setup, an adjustment mechanism may be provided, which can enable technicians to adjust the contact pressure of each individual gliding element in a controllable and secure way. By way of example, a wind turbine 100 may include twelve to eighteen yaw brakes 112/yaw assemblies that are arranged around a large gear residing at the junction of the bottom of the nacelle 106 and the top of the tower 104. The yaw assemblies may be equally spaced (common for systems with eighteen yaw assemblies) or unequally spaced (common for systems with twelve yaw assemblies). The yaw assemblies may be situated in a substantially circular arrangement. In other examples, eighteen or more (or less) such yaw assemblies may be provided. As discussed above, these yaw assemblies may utilize yaw pads that serve as gliding pads and are in sliding contact with the slew ring 114, which often forms a part of a gear and provides a surface upon which the yaw pads can glide. As further discussed above, the slew ring 114 may include teeth at an outer periphery thereof to form a gliding-disk/gear-rim. The teeth may also or instead be located at the inner or the outer cylindrical face of the slew ring 114, while the arrangement of the yaw brakes 112 and their exact number and location can vary.

Thus, during operation, yaw pads or the like may be structurally configured to apply pressure (e.g., via pressure elements such as springs) against the slew ring 114, e.g., to stabilize the nacelle 106 against undesirable movement. In particular, in certain embodiments, pressure elements may include a stack of simple steel washer springs residing inside a yaw piston. Continuing with this example, the yaw piston, under spring pressure, may press against the yaw pad to engage the yaw pad firmly against the slew ring 114. The yaw piston may be held into place by a bushing that is threaded into a housing assembly on the top of the tower 104. In other embodiments, such as those described in Int'l Patent Application No. PCT/US2016/031558, a plurality of steel force adjustment screws may facilitate the preloading of springs to press the yaw pad into firm contact with the slew ring 114.

Figure 2:
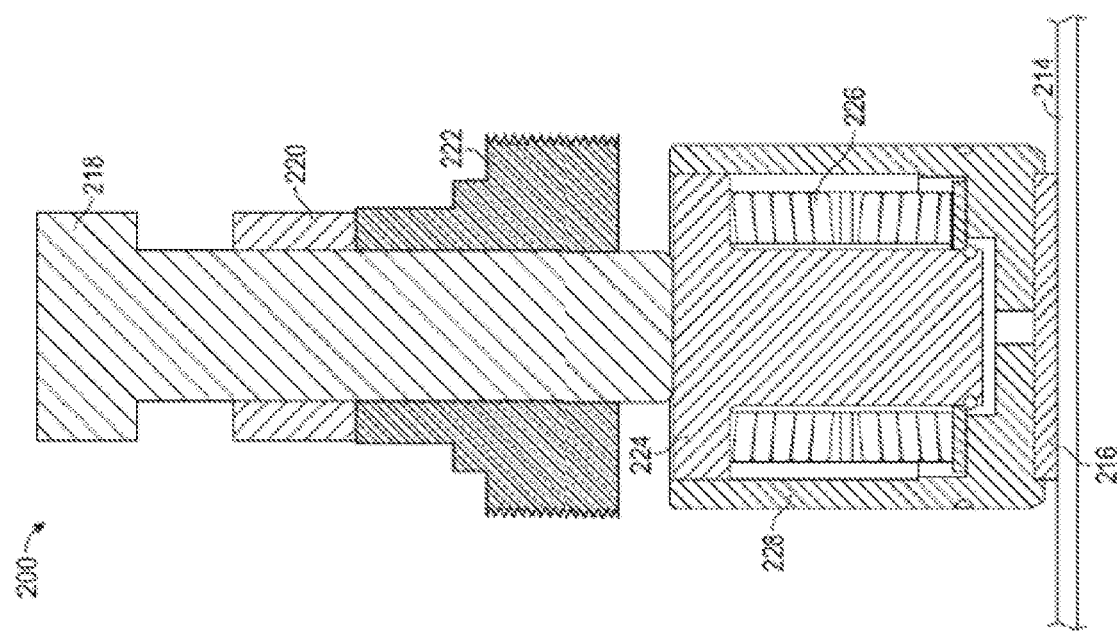
FIG. 2 illustrates a yaw brake of a wind turbine for context.

FIG. 2 illustrates a brake 200 of a wind turbine for context. Specifically, this figure shows a cutaway of a brake 200 used on a wind turbine, which may be the same or similar to the yaw brake 112 described above with reference to FIG. 1. The brake 200 may be configured for placement and securement within a framework on the top of a wind turbine, e.g., in a threaded hole on the framework, to apply a force to a slew ring 214 that is located below the framework in a housing on the wind tower. The figure shows various components of the brake 200, such as the yaw pad 216, a central bolt 218, a lock nut 220, a yaw piston bushing 222, a thrust stem 224, spring elements 226, and a mating cylinder 228.

Having provided context for the present teachings, devices, systems, and methods for slew ring repair and damage prevention are described below.

In general, a system or tool described herein may be used to repair a slew ring in situ at the top of a wind tower, e.g., without removing any components (besides possibly removing a yaw brake, which can be a relatively easy procedure). Without a system or tool as described herein, the entire top of the wind turbine would generally have to be removed for the repair of a slew ring.

The present teachings may be used for slew ring repair and damage prevention as described herein, which can include repairs, maintenance, rehabilitation, re-shaping, restoration, cleaning, upkeep, and so on, whether routine or otherwise. For example, a tool as described herein may be used to repair a groove that can form on a slew ring from engagement of a surface of the slew ring with one or more yaw brakes. Continuing with this example, to this end, a grinder such as a grinding stone may be rotated against the slew ring while the nacelle, bed frame, and/or framework containing the slew ring on the top end of the wind tower are rotated for evening-out, flattening, or polishing a surface around a circumference (or other predetermined area or region) of the slew ring.

In use, a yaw brake may be removed from the top of a wind turbine and a tool for repairing a slew ring may replace the yaw brake, or the tool may otherwise be placed in a position where the grinder is in contact with the slew ring (e.g., predetermined contact, which may include a predetermined force or pressure applied to the slew ring). For example, the tool may be secured to a bed frame or the like at the top of a wind tower. To this end, the tool may generally include a securement mechanism for engaging with the bed frame, and the tool may also or instead include one or more stabilizing components, e.g., to maintain a position of the tool once secured to a frame of the wind tower.

A tool according to the present teachings, or a drive mechanism engaged with the tool, may generally include a rotatable shaft that extends into the housing where the slew ring is disposed for engagement of a grinder with the slew ring. More specifically, a shaft coupled to a grinder may be rotated to rotate the grinder for performing a repair on the slew ring. Further, the slew ring may also or instead be rotated relative to the bed frame such that the grinder can contact and repair a circumference of the slew ring.

A tool according to the present teachings may also or instead include a magnet, vacuum, or the like for receiving debris in a housing of a wind tower (e.g., a housing containing the slew ring). The debris may be caused from the grinding or polishing of the slew ring, e.g., where removing such debris is accomplished such that the debris does not further damage the slew ring.

When a repair operation is complete, a tool according to the present teachings may be removed from the wind tower, or removed from engagement with a frame thereof. Alternatively, the grinder may simply be disengaged with the slew ring while the tool otherwise remains installed on the wind tower.

A system or tool described herein may also or instead be used for maintaining a slew ring in situ at the top of a wind tower, e.g., for damage prevention of the slew ring. In this manner, the tool may be similar to the repair tools described herein, but where the grinder is replaced by, or supplemented with, a magnet, a duster, a sweeper, a vacuum, or another similar component to capture, collect, remove, or otherwise move debris. For example, debris that forms and gathers within a housing that contains the slew ring (e.g., from engagement of the slew ring with a yaw brake) may be collected on a magnet. As described herein, the tool may also or instead include a suction device such as a vacuum device or the like.

Figure 3:
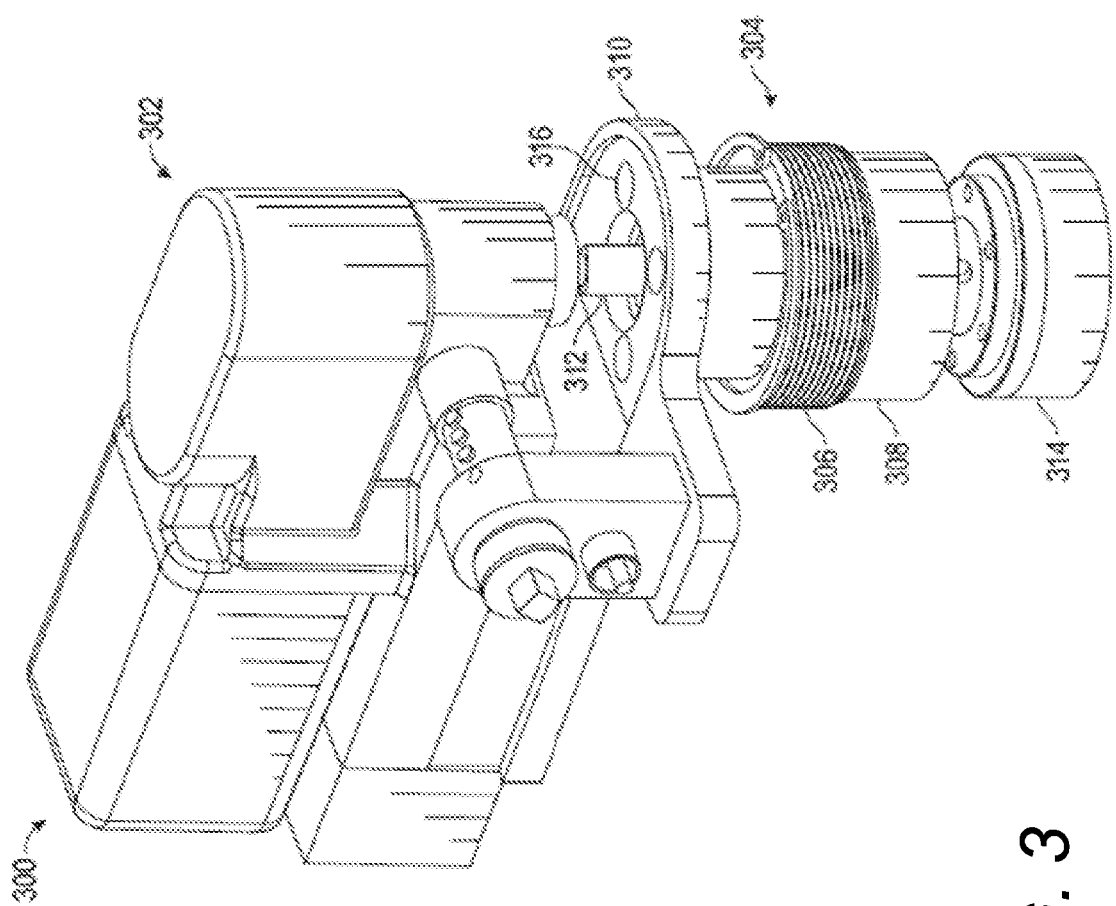
FIG. 3 illustrates a system for slew ring repair, in accordance with a representative embodiment.
Figure 4:
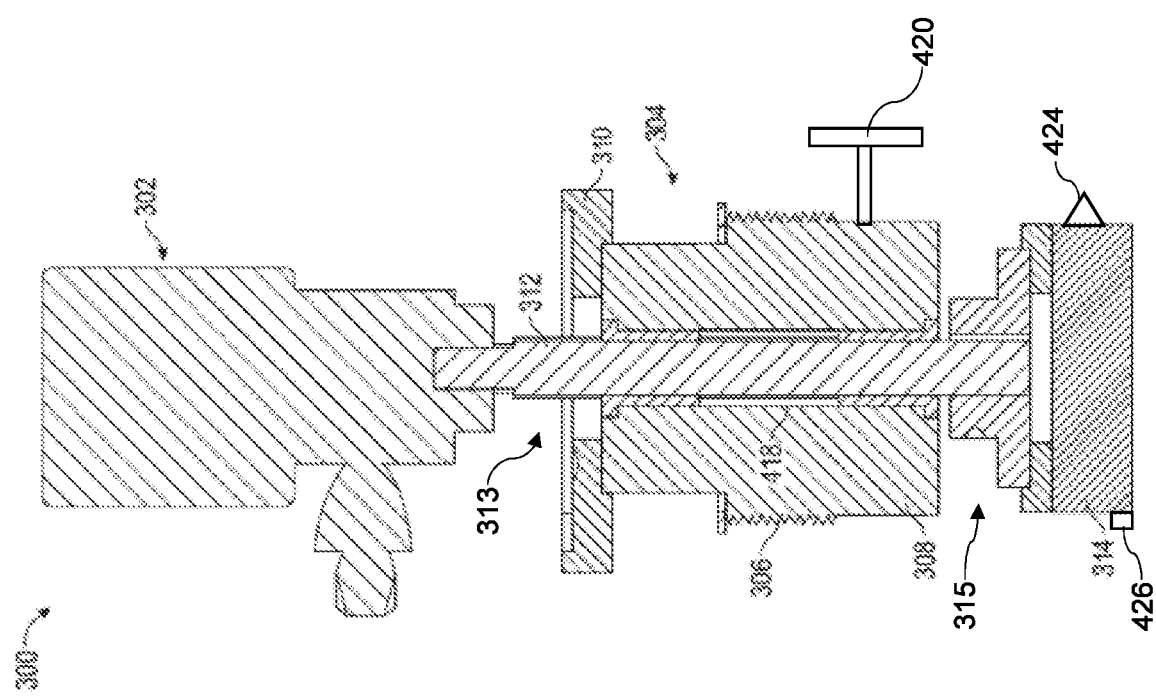
FIG. 4 illustrates a cutaway of components of a system for slew ring repair, in accordance with a representative embodiment.

FIG. 3 illustrates a system 300 for slew ring repair, in accordance with a representative embodiment. The system 300 may generally include a drive mechanism 302 and a tool 304. FIG. 4 illustrates a cutaway of components of the system 300 for slew ring repair, in accordance with a representative embodiment, where it will be understood that the system 300 shown in FIG. 4 may be the same or similar to that shown in FIG. 3.

The drive mechanism 302 may include a drill motor, such as an off-the-shelf portable "mag drill" or the like. Any of an array of air, electric, and hydraulic motors could also or instead be used to couple to the tool 304 and drive a grinder 314 as contemplated herein. The drive mechanism 302 may be robust and compact, and may provide rotation at an adequate speed for rotating a grinder 314 for repairing or smoothing a slew ring. The drive mechanism 302 may be powered by 110-volts, which may be readily available up-tower in wind turbines. Thus, the drive mechanism 302 may include a magnetic drilling machine (i.e., a "mag drill" as referenced above) or the like.

As discussed herein, the system 300 may further include a tool 304 coupled to the drive mechanism 302. It will be understood that the drive mechanism 302 and the tool 304 may be separate components that are couplable to form the system 300 (e.g., where the drive mechanism 302 and the tool 304 are removable and replaceable relative to one another), or the drive mechanism 302 and the tool 304 may be permanently coupled to one another. Similarly, in this manner, it will be understood that one or more of the features of the drive mechanism 302 described herein may also or instead be included on the tool 304, and vice-versa.

In general, the tool 304 may be configured to occupy the space commonly occupied by a yaw brake (or another component) on or in a frame on the top end of a wind tower. In this manner, the tool 304 may include a fixture 310 that is structurally configured to secure the tool 304 (or a portion thereof) to the frame on the top end of a wind tower. However, it will be understood that the tool 304 may otherwise engage with a frame or another component on the top of a wind tower, e.g., for stabilization of the tool 304. Thus, in an implementation, a yaw brake may be removed (or may otherwise be absent), and a portion of the tool 304 may occupy a hole or void that is left behind on the top end of the wind tower. In this manner, the tool 304 may include one or more engagement features 306 to engage with a frame (which may otherwise be referred to herein, or in the art, as a "bed frame") on the top of a wind tower. Also, or instead, the tool 304 may include a collar 308 sized and shaped to fit within a hole of the frame on the top end of the wind tower.

In general, the engagement features 306 may be structurally configured to secure the collar 308 (or another portion of the tool 304) to one or more of a frame and a housing on a top end of a wind tower. In some implementations, the engagement features include a plurality of threads, e.g., male threads to be engaged with or received by cooperating, female threads located on a frame of a wind tower (e.g., in a hole intended for occupancy by a yaw brake). Thus, in this manner, the engagement features 306 may include a threaded bushing as shown in FIGS. 3 and 4.

The engagement features 306 may also or instead include a movable arm 420, e.g., that can provide an expansion-type fit for the tool 304 (e.g., for the collar 308 within a hole on a frame of a wind tower). By way of example, the engagement features 306 of the tool 304 may include an expanding mandrel or the like commonly used to grip internal diameters for tooling and the like. In general, the movable arm 420 may be extendable from a first position substantially adjacent to the collar 308 of the tool 304 to a second position disposed away from the collar 308. When in the second position, the movable arm 420 may be configured to retain the tool 304 at a fixed position within a frame of the wind tower. The movable arm 420 may be extendable via an actuator or the like, which may utilize fluid pressure, electric power, manually-applied force (e.g., with appropriate gearing), or similar, for providing extension of the movable arm 420. The engagement features 306 may also or instead include set screws, a caliper ring, a wedge, or the like. In general, the engagement features 306 may be structurally configured to secure and stabilize the tool 304 at the top end of the wind tower, e.g., such that a body of the tool 304 does not move during operation of the tool 304 or the wind turbine (e.g., if the tool 304 remains on the wind tower during operation of the wind turbine as contemplated herein in some implementations).

As discussed above, the engagement features 306 may be disposed on, or themselves may form in whole or in part, a collar 308 that is sized to fit within a hole or void on the frame at the top end of a wind tower—e.g., the hole configured for a yaw brake (an insertion point for a yaw brake of the wind turbine). The collar 308 may be engaged with a fixture 310 that stabilizes one or more of the tool 304 and the drive mechanism 302 on the top of the wind turbine, e.g., by coupling one or more of the foregoing to a frame or housing on the wind tower. To this end, the fixture 310 may include a plate or the like that is structurally configured to secure to a top portion of a frame on the top end of a wind tower Thus, the fixture 310 may be sized and shaped, or may include, a plate or other similar framework for stabilizing one or more of the tool 304 and the drive mechanism 302 to a portion of a wind tower. Also, or instead, the fixture 310 may include one or more holes 316 sized and shaped for an insertion of one or more couplers to secure the fixture 310 to a frame on the top end of a wind tower. More specifically, the fixture 310 may include one or more holes 316 structurally configured for cooperation with bolts, screws, or the like, e.g., to secure the fixture 310 to the frame on the top of the wind tower.

The tool 304 may include one or more bearings 418 or the like such that the stationary components—e.g., the collar 308 and the fixture 310—can engage or otherwise cooperate with movable components of one or more of the tool 304 and the drive mechanism 302, e.g., a rotatable shaft 312 for rotation of a grinder 314. For example, and as shown in FIG. 4, the tool 304 may include one or more bearings 418 disposed between the collar 308 and the rotatable shaft 312. Alternatively, in some implementations, the rotatable shaft 312 may simply be located within the collar 308 such that it can spin freely within a void of the collar 308 so that these components do not physically contact one another. The tool 304 may also or instead include one or more other machine elements that constrain relative motion to a desired motion, and that reduce friction between moving parts or the like (e.g., bushings or the like) to connect or engage different components of the tool 304 or system 300.

Thus, as discussed above, the tool 304 may include a rotatable shaft 312. The rotatable shaft 312 may include a proximal end 313 and a distal end 315, where the proximal end 313 is coupled to the drive mechanism 302 and the distal end 315 is structurally configured to insert within a housing on the top end of a wind tower, e.g., the housing containing a slew ring of a wind turbine disposed on the wind tower. The rotatable shaft 312 may be disposed within a bore defined by the collar 308 as best shown in FIG. 4. The rotatable shaft 312 may also or instead be part of or integral with the drive mechanism 302.

It will be understood that, although generally described herein as a "rotatable shaft," the shaft 312 may also or instead be movable in a manner that differs from rotation thereof. For example, the drive mechanism 302 may be structurally configured to move the shaft 312 relative to a slew ring, where such movement may include one or more of rotation, oscillation, vibration, up-and-down or side-to-side movement, and the like. It will be further understood that the shaft 312 may remain stationary, e.g., while the grinder 314 or another component moves, or while a slew ring moves relative to the tool 304.

In an implementation, one or more of the collar 308, the fixture 310, and the rotatable shaft 312 are made of steel. However, it will be understood that other materials are also or instead possible for one or more of these components such as wood, composites, plastic, other metals, ceramic, and so on.

As discussed herein, the tool 304 may include a grinder 314. The grinder 314 may be disposed on the distal end 315 of the rotatable shaft 312, and may be structurally configured to engage or otherwise cooperate with a slew ring, e.g., while being rotated by the drive mechanism 302 for repair or other maintenance of the slew ring. It will be understood that, although referred to as a "grinder" and although the grinder 314 may indeed perform a grinding function in some implementations, in general, the grinder 314 should be understood to include any component that is structurally configured to perform a maintenance task with regard to another component of a wind turbine or wind tower, such as a slew ring. Thus, in this context, the grinder 314 may not actually perform a grinding function in some implementations.

By way of example, in certain implementations, the grinder 314 may include one or more of a sander, a polisher, and a cutting tool 424. For example, the grinder 314 may include a sander or polisher, such as a sanding stone or the like. In some implementations, the grinder 314 may include a material sized, shaped, and textured to repair or smooth a slew ring. This may be provided through rotation of the grinder 314, rotation or movement of the slew ring, or some combination of these.

As stated above, in some implementations, the grinder 314 may also or instead include a cutting tool 424 or the like. The cutting tool 424 may include one or more cutting teeth or the like, which may be removable and replaceable on the tool 304. In this manner, the cutting tool 424 may include cutting inserts. By way of example, the cutting tool 424 may resemble a shell mill or other milling cutter, and may thus include a modular cutting device that can be placed on the distal end 315 of the rotatable shaft 312. Such a modular cutting device may include shell or housing that engages with indexable inserts or similar (e.g., replaceable carbide teeth) to be used as the cutting edges. A cutting tool 424 may be desirous or advantageous in the context of wind towers and wind turbines because a cutter can smooth a relatively rough surface in a short period of time—e.g., a rough surface of a slew ring. However, a grinding stone or polisher may instead be advantageous because of risks posed by a cutter, such as gouging a surface in an undesirable manner.

It will be understood that the grinder 314 may be structurally configured to engage with a top surface of a slew ring. However, in other implementations, the grinder 314 may also or instead be structurally configured to engage with other surfaces of a slew ring, such as the bottom surface or a side surface. For example, the system 300 may be structurally configured to replace or supplement a caliper-type yaw brake that engages both the top and bottom surfaces of a slew ring. In this manner, the grinder 314 may also or instead engage both of these surfaces, and may thus include a caliper-type design.

The grinder 314 may also or instead include a debris remover 426. The debris remover 426 may be provided to remove shavings, grindings, dust, or other debris on or around a slew ring within a housing of a wind tower. By way of example, such a debris remover 426 may include one or more magnets (e.g., to attract and collect metal dust or grindings), a suction device such as a vacuum, and the like.

During use and operation of the system 300, stabilization of the tool 304 may be provided so that the grinder 314 maintains a predetermined engagement, orientation, and alignment with the slew ring. For example, it may be advantageous for a contact surface of the grinder 314 to be disposed substantially normal to a top surface of the slew ring. Thus, in this manner, the tool 304 may be structurally configured to align a contact surface of the grinder 314 substantially normal to a top surface of the slew ring when inserted within a housing on a wind tower. A predetermined force may also or instead be maintained between the grinder 314 and the slew ring during a repair operation. Thus, in this manner, the tool 304 may be structurally configured to maintain a predetermined force between the grinder 314 and the slew ring during operation of the tool 304. In other implementations, the grinder 314 may not touch the slew ring, but instead the grinder 314 may be positioned relative thereto such as hovering a predetermined distance above the slew ring, e.g., in embodiments where the grinder 314 includes a debris remover 426.

FIG. 5 illustrates yaw brakes 502 on a top end of a wind tower 504 for context. As shown in the figure, the yaw brakes 502 may be arranged at the junction of the bottom of the nacelle 506 and the top of the wind tower 504. The yaw brakes 502 may be situated in a substantially circular or otherwise circumferential arrangement. It will be understood that, although depicted as yaw brakes 502, other components or equipment of the wind tower 504 may be arranged in a similar manner.

FIG. 6 illustrates a system 600 for slew ring repair on a top end 601 of a wind tower 604, in accordance with a representative embodiment. Specifically, the wind tower 604 in FIG. 6 may be the same or similar to that shown in FIG. 5, but where one of the yaw brakes 502 has been replaced in FIG. 6 by a system 600 or tool for slew ring repair as described herein. Although only one of the yaw brakes 502 is shown as replaced by a system 600 for slew ring repair, it will be understood that more than one system 600 or tool for slew ring repair may be used, i.e., replacing more than one of the yaw brakes 502 at any given time. Also, or instead, the system 600 or tool for slew ring repair may replace or supplement another component of the wind tower 604 or wind turbine, or may otherwise occupy a space on the wind tower 604 or wind turbine without supplementing or replacing another component or piece of equipment. In this manner, a wind tower 604 may have a designated space (e.g., hole in a frame) specifically configured for a system 600 or tool for slew ring repair.

It will be understood that, although the system 600 or tool for slew ring repair may be depicted as having a substantially cylindrical shape, other shapes are also or instead possible, such as a box-shape.

FIG. 7 illustrates a tool 700, in accordance with a representative embodiment. The tool 700 may be the same or similar to other tools/systems for slew ring maintenance or repair as described herein, but may be devoid of a drive mechanism. However, the tool 700 may still be structurally configured for optional or conditional engagement or cooperation with a drive mechanism or other piece of mechanical equipment. In other implementations, no such configuration for engagement or cooperation with another piece of mechanical equipment is provided for the tool 700, i.e., the tool 700 can be a standalone component for use on a wind tower or wind turbine.

The tool 700 may include a fixture 710 structurally configured to secure the tool 700 to a frame on a top end of a wind tower. The fixture 710 may be the same or similar to other fixtures as described herein, and may thus include the same or similar features, such as one or more holes 716 sized and shaped for insertion of one or more couplers to secure the fixture 710 to a frame on the top end of a wind tower. In this manner, the fixture 710 may act as a securement component for the tool 700, i.e., to engage and secure the tool 700 relative to a framework or a housing of a wind tower or wind turbine. It will be understood, however, that other securement components may also or instead be provided, such as a collar 708. Thus, in certain implementations, a tool 700 can include only a fixture 710 without a collar 708, only a collar 708 without a fixture 710, or a tool 700 may include both as depicted in the figure.

As discussed above, the tool 700 may include a collar 708, which may be engaged with the fixture 710. In general, the collar 708 may be sized and shaped to fit within a hole of the frame on the top end of the wind tower, e.g., a hole configured for a yaw brake or other component on a wind tower. The collar 708 may include any of the engagement features described herein, e.g., for securement of the tool 700 on the wind tower.

The tool 700 may include a shaft 712 having a distal end 715 structurally configured to insert within a housing on the top end of the wind tower, e.g., where the housing contains a slew ring of a wind turbine disposed on the wind tower. The shaft 712 (e.g., on a proximal end thereof) may be engaged with the fixture 710 or another securement component of the tool 700, such as a collar 708. In other implementations, the shaft 712 and the collar 708 are the same component, e.g., the debris remover 714 described below and shown in FIG. 7 may be connected to the collar 708 instead of a dedicated shaft 712.

The tool 700 may include a debris remover 714 disposed on the distal end 715 of the shaft 712. As discussed herein, the debris remover 714 may include one or more magnets, a vacuum, combinations thereof, and the like. It will be understood that the debris remover 714 may also or instead include a grinder as described herein, such as a grinding stone or polisher.

Figure 8:
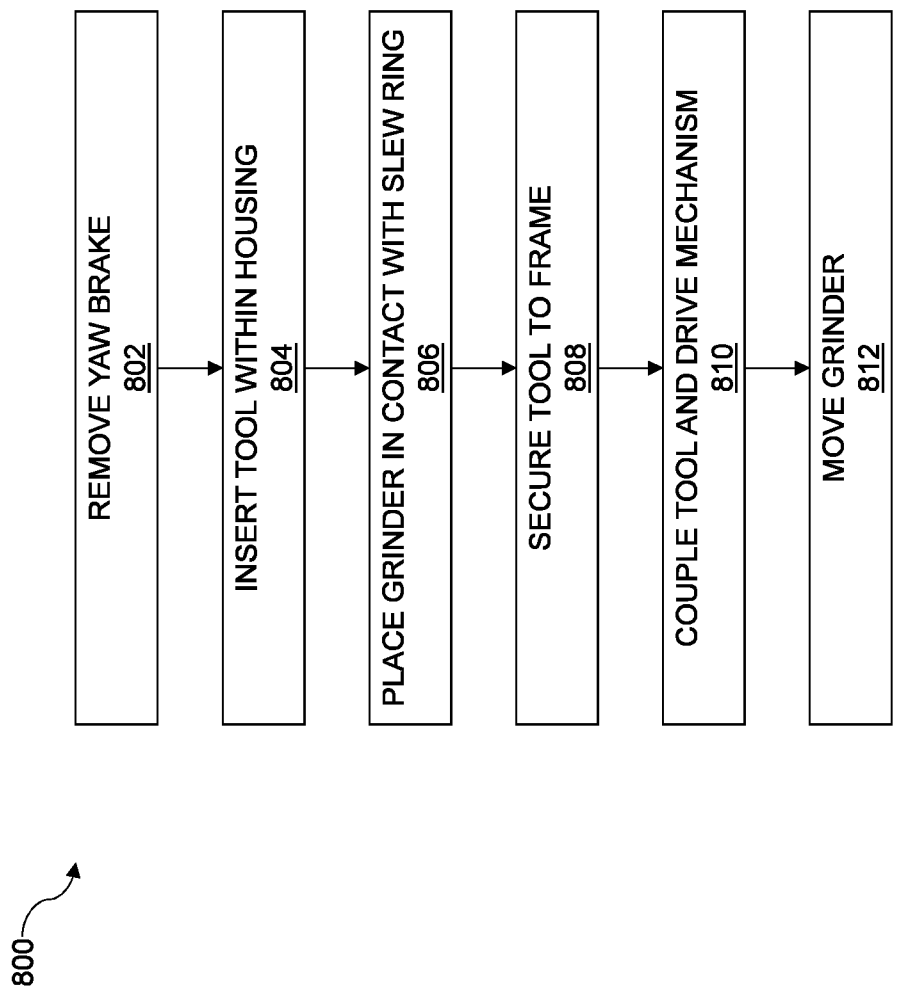
FIG. 8 is a flow chart of a method for slew ring maintenance, in accordance with a representative embodiment.

FIG. 8 is a flow chart of a method 800 for slew ring maintenance, in accordance with a representative embodiment. The method 800 may be performed using one or more of the tools and systems discussed herein.

As shown in block 802, the method 800 may include removing a yaw brake from a frame on the top end of a wind tower, e.g., for performing maintenance on a component of the wind tower such as a slew ring, which may be located within a housing engaged with the frame on the top end of the wind tower. The yaw brake may be removed leaving behind a hole or void that can be subsequently occupied by a tool or system as described herein for performing slew ring maintenance. Also, or instead, another component of the wind tower may be removed to facilitate use of a tool or system as described herein. Alternatively, the frame on the top end of a wind tower may have a void or other dedicated space for cooperation and engagement with a tool or system as described herein, thereby negating any need for removal of a yaw brake or other component.

As shown in block 804, the method 800 may include inserting at least a portion of a tool for slew ring maintenance within the housing on a top end of a wind tower. As discussed above, the housing may contain a slew ring of a wind turbine that is disposed on the wind tower. The portion of the tool that is inserted within the housing may include a shaft (e.g., a movable shaft, such as one that is structurally configured to rotate, oscillate, vibrate, move up and down or side to side, or some combination thereof) having a grinder, or other maintenance or repair device, disposed on a distal end thereof, as described herein. The shaft may instead be stationary, e.g., where a grinder engaged to the shaft moves relative to the shaft.

As shown in block 806, the method 800 may include placing the grinder in a predetermined position relative to the slew ring, e.g., placing the grinder in contact with the slew ring. As discussed herein, the grinder may include one or more of a sander, a polisher, a cutting tool, a debris remover, and so on.

As shown in block 808, the method 800 may include securing the tool to a frame on the top end of the wind tower. This may be accomplished by any of the techniques discussed herein, including for example, affixing a fixture to the frame or engaging a collar to a hole in the frame or housing.

As shown in block 810, the method 800 may include coupling the tool with a drive mechanism. Alternatively, the tool may be pre-coupled with a drive mechanism, or such coupling may otherwise be unnecessary for performing maintenance.

As shown in block 812, the method 800 may include moving a shaft of the tool, thereby moving the grinder of the tool relative to the slew ring. Such motion may include rotation of the shaft/grinder, oscillation of the shaft/grinder, vibration of the shaft/grinder, moving one or more of the shaft/grinder up and down or side to side, or some combination of these. Also, or instead, the slew ring may be rotated or otherwise moved relative to the tool/grinder. Moreover, in some implementations, rotation may be unnecessary for performing maintenance.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A system for slew ring repair, comprising:
    a drive mechanism; and
    a tool coupled to the drive mechanism, the tool comprising:
        a fixture structurally configured to secure the tool to a frame on a top end of a wind tower;
        a rotatable shaft having a proximal end and a distal end, the proximal end coupled to the drive mechanism, the distal end structurally configured to insert within a housing on the top end of the wind tower, the housing containing a slew ring of a wind turbine disposed on the wind tower; and
        a grinder disposed on the distal end of the rotatable shaft, the grinder structurally configured to engage the slew ring while being rotated by the drive mechanism for repair of the slew ring.

2. The system of claim 1, further comprising a collar engaged with the fixture, the collar sized and shaped to fit within a hole of the frame on the top end of the wind tower, where the rotatable shaft is disposed within a bore defined by the collar.

3. The system of claim 2, where the collar comprises one or more engagement features structurally configured to secure the collar to one or more of the frame and the housing on the top end of the wind tower.

4. The system of claim 3, where the one or more engagement features comprise a plurality of threads.

5. The system of claim 3, where the one or more engagement features comprise a movable arm.

6. The system of claim 2, further comprising one or more bearings disposed between the collar and the rotatable shaft.

7. The system of claim 2, where the hole comprises an insertion point for a yaw brake of the wind turbine.

8. The system of claim 1, where the drive mechanism comprises a magnetic drilling machine.

9. The system of claim 1, where the tool is structurally configured to align a contact surface of the grinder substantially normal to a top surface of the slew ring when inserted within the housing.

10. The system of claim 1, where the tool is structurally configured to maintain a predetermined force between the grinder and the slew ring during operation of the tool.

11. The system of claim 1, where the fixture comprises one or more holes sized and shaped for an insertion of one or more couplers to secure the fixture to the frame.

12. The system of claim 1, further comprising a debris remover.

13. The system of claim 12, where the debris remover comprises one or more magnets.

14. The system of claim 1, where the fixture comprises a plate.

15. The system of claim 1, where the grinder comprises one or more of a sander, a polisher, and a cutting tool.

16. A tool, comprising:
    a fixture structurally configured to secure the tool to a frame on a top end of a wind tower;
    a shaft having a distal end structurally configured to insert within a housing on the top end of the wind tower, where the housing contains a slew ring of a wind turbine disposed on the wind tower; and
    a debris remover disposed on the distal end of the shaft.

17. The tool of claim 16, where the debris remover comprises one or more magnets.

18. The tool of claim 16, where the debris remover comprises a vacuum.

19. The tool of claim 16, further comprising a collar engaged with the fixture, the collar sized and shaped to fit within a hole of the frame on the top end of the wind tower.

20. A method for slew ring maintenance, the method comprising:
    inserting at least a portion of a tool within a housing on a top end of a wind tower, the housing containing a slew ring of a wind turbine disposed on the wind tower, the portion of the tool comprising a movable shaft having a grinder disposed on a distal end thereof;
    placing the grinder in contact with the slew ring;
    securing the tool to a frame on the top end of the wind tower; and
    moving the movable shaft thereby moving the grinder relative to the slew ring.

\* \* \* \* \*